United States Patent
Wu et al.

(10) Patent No.: US 8,687,579 B2
(45) Date of Patent: Apr. 1, 2014

(54) DETECTION METHOD AND DETECTION DEVICE OF DOWNLINK CONTROL INFORMATION

(75) Inventors: Xin Wu, Shenzhen (CN); Bo Dai, Shenzhen (CN); Ping Zeng, Shenzhen (CN); Zhisong Zuo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/259,980

(22) PCT Filed: Aug. 23, 2010

(86) PCT No.: PCT/CN2010/076248
§ 371 (c)(1),
(2), (4) Date: Aug. 16, 2012

(87) PCT Pub. No.: WO2011/120278
PCT Pub. Date: Oct. 6, 2011

(65) Prior Publication Data
US 2013/0028108 A1    Jan. 31, 2013

(30) Foreign Application Priority Data
Apr. 2, 2010    (CN) .......................... 2010 1 0154679

(51) Int. Cl.
*H04W 4/00*    (2009.01)
(52) U.S. Cl.
USPC .......................................... 370/329; 370/338
(58) Field of Classification Search
CPC ..... H04L 5/0053; H04L 5/001; H04L 5/0094; H04L 5/0007; H04W 72/042
See application file for complete search history.

(56) References Cited

U.S. PATENT DOCUMENTS

| | | | |
|---|---|---|---|
| 2010/0254268 A1* | 10/2010 | Kim et al. | 370/241 |
| 2011/0044261 A1* | 2/2011 | Cai et al. | 370/329 |
| 2011/0075624 A1* | 3/2011 | Papasakellariou et al. | 370/329 |
| 2011/0076962 A1* | 3/2011 | Chen et al. | 455/68 |
| 2011/0228724 A1* | 9/2011 | Gaal et al. | 370/328 |
| 2011/0228732 A1* | 9/2011 | Luo et al. | 370/329 |
| 2013/0195039 A1* | 8/2013 | Pan et al. | 370/329 |

FOREIGN PATENT DOCUMENTS

| | | |
|---|---|---|
| CN | 101478808 A | 7/2009 |
| CN | 101505498 A | 8/2009 |
| CN | 101790190 A | 7/2010 |

OTHER PUBLICATIONS

International Search Report, Oct. 6, 2011, 6 pages, PCT/CN2010/076248.

(Continued)

*Primary Examiner* — Jung Park
(74) *Attorney, Agent, or Firm* — Marger Johnson & McCollom PC

(57) ABSTRACT

The present invention discloses a method for detecting downlink control information, including: when scheduling across carriers is enabled, determining by user equipment (UE) user-specific search space monitoring a physical downlink control channel (PDCCH) according to component carrier indexes, wherein the component carrier indexes include component carrier indexes corresponding to various component carriers implementing scheduling across carrier and being scheduled across carriers. Also the present invention also provides an apparatus for detecting downlink control information, a user equipment and a network side device. The present invention solve the overlap problem of common search space and user-specific search space in Release 10 and solves the problem of determining a search space for the PDCCH in the situation of scheduling across carriers is enabled in Release 10.

14 Claims, 1 Drawing Sheet

(56) References Cited

OTHER PUBLICATIONS

3GPP Technical Specification Group Radio Access Network, Evolved Universal Terrestrial Radio Access (E-UTRA); Physical layer procedures (Release 9), 3GPP TS 36.213 V9.0.1, Dec. 2009, 81 pages.

Panasonic, Handing of overlapping common search space and UE-specific search space for cross carrier scheduling, 3GPP TSG-RAN WG1 Meeting #60bis, Apr. 16, 2010, 3 pages.

Office action dated Nov. 5, 2013 for Japanese Application No. 2013-501597, "Further discussion on PDCCH with cross carrier operation," Source: Panasonic, R1-100361, 3GPP TSG-RAN WG1 Meeting #59bis, Jan. 18-22, 2010, Valencia, Spain, 7 pages.

Office action dated Nov. 5, 2013 for Japanese Application No. JP2013-501597, "Change Request," R1-084705, 3GPP TSG-RAN Meeting #55, Nov. 10-14, 2008, Prague, Czech Republic, 14 pages.

Office action dated Nov. 5, 2013 for Japanese Application No. JP2013-501597, "PDCCH with cross carrier operation," R1-101249, 3GPP TSG-RAN Meeting #60, Jan. 22-26, 2010, San Francisco, CA, 6 pages.

Office action dated Nov. 5, 2013 for Japanese Application No. JP2013-501597, "Component carrier indication scheme for carrier aggregation," R1-093465, 3GPP TSG-RAN Meeting #58, Aug. 24-28, 2009, Shenzhen, China, 4 pages.

* cited by examiner

DETECTION METHOD AND DETECTION DEVICE OF DOWNLINK CONTROL INFORMATION

TECHNICAL FIELD

The present invention relates to the communication field, and particularly, to a method and apparatus for detecting downlink control information.

BACKGROUND OF THE RELATED ART

The radio frame in the long term evolution (LTE) system includes frame structures of frequency division duplex (FDD) mode and time division duplex (TDD) mode. The frame structure of FDD mode is as shown in FIG. 1, wherein a 10 ms radio frame is composed of twenty slots with the length of 0.5 ms and numbered as 0-19, and slots $2i$ and $2i+1$ form a subframe i with the length of 1 ms. The frame structure of TDD mode is as shown in FIG. 2, wherein a 10 ms radio frame is composed of two half frames with the length of 5 ms, each includes 5 subframes with the length of 1 ms, and subframe i is defined as 2 slots $2i$ and $2i+1$ with the length of 0.5 ms. In the above two frame structures, as to normal cyclic prefix (Normal CP), one slot includes 7 symbols with the length of 66.7 us, wherein the CP length of the first symbol is 5.21 us, and the CP length of the remaining 6 symbols is 4.69 us; and as to an extended cyclic prefix (Extended CP), one slot includes 6 symbols, and the CP length of all the symbols is 16.67 us.

The release number of LTE corresponds to Release 8 (R8), and added release corresponds to the release number of Release 9 (R9), and as to the subsequent LTE-Advance, its release number is Release 10 (R10). The following three physical downlink control channel are defined in LTE: Physical Control Format Indicator Channel (PCFICH), Physical Hybrid Automatic Retransmission Request Indicator Channel (PHICH), and Physical Downlink Control Channel (PDCCH).

In this case, the information carried by PCFICH is used for indicating the number of orthogonal frequency division multiplexing (OFDM) symbols of the PDCCH transmitted in a subframe, where the symbols are sent on the first OFDM symbol of the subframe, and the frequency location thereof is determined by the system downlink bandwidth and the cell identity (ID).

PHICH is used for carrying Acknowledge/Non-acknowledge (ACK/NACK) feedback information of the uplink transmission data. The number and time frequency location of PHICH can be determined by the system message and cell ID in a physical broadcast channel (PBCH) of a downlink carrier where PHICH is located.

PDCCH is used for carrying downlink control information (DCI), including uplink scheduling information, downlink scheduling information, and uplink power control information. The formats of DCI are divided into: DCI format 0, DCI format 1, DCI format 1A, DCI format 1B, DCI format 1C, DCI format 1D, DCI format 2, DCI format 2A, DCI format 3, DCI format 3A, etc., wherein:

DCI format 0 is used for indicating the scheduling of the physical uplink shared channel (PUSCH);

DCI format 1, DCI format 1A, DCI format 1B, DCI format 1C, DCI format 1D are used for different scheduling modes of one PDSCH codeword;

DCI format 2, DCI format 2A, and DCI format 2B are used for different space division multiplexing modes;

DCI format 3 and DCI format 3A are used for different modes of physical uplink control channel (PUCCH) and power control instructions of PUSCH.

In this case, for different bandwidths, the size of the information domain of each DCI format is as shown in Table 1:

TABLE 1

|  | 1.4 MHz | 3 MHz | 5 MHz | 10 MHz | 15 MHz | 20 MHz |
| --- | --- | --- | --- | --- | --- | --- |
| Format 0/1A | 21 | 22 | 25 | 27 | 27 | 28 |
| Format 1 | 19 | 23 | 27 | 31 | 33 | 39 |
| Format 1B | 22 | 25 | 27 | 28 | 29 | 30 |
| Format 1C | 8 | 10 | 12 | 13 | 14 | 15 |
| Format 1D | 22 | 25 | 27 | 28 | 29 | 30 |
| Format 2 | 31 | 34 | 39 | 43 | 45 | 51 |
| Format 2A | 28 | 31 | 36 | 41 | 42 | 48 |
| Format 2B | 25 | 28 | 33 | 38 | 39 | 45 |
| Format 3/3A | 21 | 22 | 25 | 27 | 27 | 28 |

The physical resources transmitted by the physical downlink control channel are in the unit of control channel element (CCE), the size of one CCE is 9 resource element groups (REG), i.e. 36 resource elements, and one PDCCH may occupy 1, 2, 4, or 8 CCEs. As to the sizes of these four types of PDCCHs occupying 1, 2, 4, or 8 CCEs, tree aggregation is used, i.e. the PDCCH occupying 1 CCE can start from any CCE location; the PDCCH occupying 2 CCEs starts from even CCE location; the PDCCH occupying 4 CCEs starts from the CCE location which is an integral multiple of 4; and the PDCCH occupying 8 CCEs starts from the CCE location which is an integral multiple of 8.

Each aggregation level defines a search space, including common search space and user equipment-specific (UE-Specific) search space. The number of CCEs of the entire search space is determined by the number of OFDM symbols occupied by the control area indicated by PCFICH in each downlink subframe and the number of PHICH groups. UE carries out blind detection on all the possible PDCCH code rates according to the DCI formats of the transmission modes in the search space.

In the $k^{th}$ subframe, the control domain carrying PDCCH is composed of a group of $N_{CCE,k}$ CCEs numbered from 0 to $N_{CCE,k}-1$. UE should detect a group of PDCCH candidates in each non-discontinuous reception (non-DRX) subframes so as to acquire control information, and the detection refers to decoding the PDCCHs in the group according to all the DCI formats to be detected. The PDCCH candidates to be detected is defined in the manner of search space, and as to the aggregation level $L \in \{1, 2, 4, 8\}$, the search space $S_k^{(L)}$ is defined by a group of PDCCH candidates. The CCE corresponding to PDCCH candidate m in the search space $S_k^{(L)}$ is defined by the following formula:

$$L \cdot \{(Y_k + m) \bmod \lfloor N_{CCE,k}/L \rfloor\} + i,$$

where $i=0, \ldots, L-1$, $m=0, \ldots, M^{(L)}-1$, $M^{(L)}$ is the number of PDCCH candidates to be detected in the search space $S_k^{(L)}$.

As to the common search space, $Y_k=0$, L takes the values of 4 and 8.

As to UE-specific search space, L takes the values of 1, 2, 4, and 8.

$$Y_k = (A \cdot Y_{k-1}) \bmod D,$$

Where $Y_{-1} = n_{RNTI} \neq 0$, $A=39827$, $D=65537$, $k=\lfloor n_s/2 \rfloor$, $\lfloor \ \rfloor$ represents round down, and $n_s$ is a slot number in a radio frame. $n_{RNTI}$ is the corresponding radio network temporary identifier (RNTI).

UE should detect each of the common search spaces with the aggregation levels of 4 and 8 and each of the UE-specific search spaces with the aggregation levels of 1, 2, 4 and 8, and the common search spaces and UE-specific search spaces may be overlapped. The detection times and the corresponding search spaces are as shown in Table 2:

TABLE 2

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

UE is configured to receive the PDSCH data transmission according to the instruction of the PDCCH of the UE-specific search space based on one of the following transmission modes semi-statically by way of a high layer signaling:

Mode 1: Single-antenna port; port 0
Mode 2: Transmit diversity
Mode 3: Open-loop spatial multiplexing
Mode 4: Closed-loop spatial multiplexing
Mode 5: Multi-user Multi-Input Multi-Output (Multi-user MIMO)
Mode 6: Closed-loop Rank=1 pre-coding
Mode 7: Single-antenna port; port 5

If the UE is configured by the high layer to decode the PDCCH using the cyclic redundancy check (CRC) scrambled by cell radio network temporary identifier (C-RNTI), then the UE shall decode the PDCCH and all the relevant PDSCHs according to the corresponding combination defined in Table 3:

TABLE 3

| UE downlink transmission mode | DCI format | Search space | Corresponding PDSCH transmission solution of PDCCH |
|---|---|---|---|
| Mode 1 | DCI format 1A | Common and C-RNTI-defined UE specific | Single-antenna port Port 0 |
| | DCI format 1 | C-RNTI-defined UE specific | Single-antenna port Port 0 |
| Mode 2 | DCI format 1A | Common and C-RNTI-defined UE specific | Transmit diversity |
| | DCI format 1 | C-RNTI-defined UE specific | Transmit diversity |
| Mode 3 | DCI format 1A | Common and C-RNTI-defined UE specific | Transmit diversity |
| | DCI format 2A | C-RNTI-defined UE specific | Open-loop spatial multiplexing or transmit diversity |
| Mode 4 | DCI format 1A | Common and C-RNTI-defined UE specific | Transmit diversity |
| | DCI format 2 | C-RNTI-defined UE specific | Closed-loop spatial multiplexing or transmit diversity |
| Mode 5 | DCI format 1A | Common and C-RNTI-defined UE specific | Transmit diversity |
| | DCI format 1D | C-RNTI-defined UE specific | Multi-user MIMO |
| Mode 6 | DCI format 1A | Common and C-RNTI-defined UE specific | Transmit diversity |
| | DCI format 1B | C-RNTI-defined UE specific | Closed-loop Rank = 1 precoding |
| Mode 7 | DCI format 1A | Common and C-RNTI-defined UE specific | Closed-loop Rank = 1 precoding If the number of PBCH antenna ports is 1, employ single-antenna port, port 0, otherwise, transmit diversity |
| | DCI format 1 | C-RNTI-defined UE specific | Single-antenna port Port 5 |
| Mode 8 | DCI format 1A | Common and C-RNTI-defined UE specific | If the number of PBCH antenna ports is 1, employ single-antenna port, port 0, otherwise, transmit diversity |
| | DCI format 2B | C-RNTI-defined UE specific | dual-layer transmission Ports 7 and 8 or single-antenna port Port 7 or 8 |

If the UE is configured by the high layer to decode the PDCCH using the CRC scrambled by the semi-persistently scheduled cell radio network temporary identifier (SPS C-RNTI), then the UE shall decode the PDCCH and all the relevant PDSCHs according to the corresponding combination defined in Table 4:

TABLE 4

| UE downlink transmission mode | DCI format | Search space | Corresponding PDSCH transmission solution of PDCCH |
|---|---|---|---|
| Mode 1 | DCI format 1A | Common and C-RNTI-defined UE specific | Single-antenna port Port 0 |
| | DCI format 1 | C-RNTI-defined UE specific | Single-antenna port Port 0 |
| Mode 2 | DCI format 1A | Common and C-RNTI-defined UE specific | Transmit diversity |
| | DCI format 1 | UE specific by C-RNTI | Transmit diversity |
| Mode 3 | DCI format 1A | Common and C-RNTI-defined UE specific | Transmit diversity |
| | DCI format 2A | C-RNTI-defined UE specific | Transmit diversity |
| Mode 4 | DCI format 1A | Common and C-RNTI-defined user specific | Transmit diversity |
| | DCI format 2 | C-RNTI-defined UE specific | Transmit diversity |
| Mode 5 | DCI format 1A | Common and C-RNTI-defined UE specific | Transmit diversity |
| Mode 6 | DCI format 1A | Common and C-RNTI-defined UE specific | Transmit diversity |
| Mode 7 | DCI format 1A | Common and C-RNTI-defined UE specific | Single-antenna port Port 5 |
| | DCI format 1 | C-RNTI-defined UE specific | Single-antenna port Port 5 |
| Mode 8 | DCI format 1A | Common and C-RNTI-defined UE specific | Single-antenna port Port 7 |
| | DCI format 2B | C-RNTI-defined UE specific | Single-antenna port Port 7 or 8 |

If the UE is configured by the high layer to decode the PDCCH using the CRC scrambled by transmit power control—cell radio network temporary identifier (TPC-PUCCH- RNTI), then the UE shall decode the PDCCH according to the corresponding combination defined in Table 5:

TABLE 5

| DCI format | Search space |
|---|---|
| DCI format 3/3A | Common search space |

If the UE is configured by the high layer to decode the PDCCH using the CRC scrambled by transmit power control-uplink shared channel-cell radio network temporary identifier (TPC-PUSCH-RNTI), then the UE shall decode the PDCCH according to the corresponding combination defined in Table 6.

TABLE 6

| DCI format | Search space |
|---|---|
| DCI format 3/3A | Common search space |

Since the LTE-Advanced network needs to be able to be accessed by the LTE users, the operating frequency band thereof needs to cover the current LTE frequency band. There is already no continuous 100 MHz frequency spectrum bandwidth which can be allocated on this band, so a direct technique to be solved by LTE-Advanced is to aggregate several continuous component carriers (frequency spectrum) distributed on different frequency ranges using the carrier aggregation technology to form a 100 MHz bandwidth which can be used by LTE-Advanced. That is, as to the aggregated frequency spectrum, it is divided into n component carrier frequencies (frequency spectrums), and the frequency spectrum in each component carrier frequency (frequency spectrum) is continuous.

3GPP is set in the carrier aggregation scenario, and can schedule a plurality of component carriers in the manner of across component carrier scheduling, i.e. it can monitor the downlink control channels (PDCCH) of other component carriers on one certain component carrier. Then, it is necessary to add a carrier indicator field (CIF) in the downlink control information format (DCI format) to determine the monitored PDCCH is the PDCCH of which component carrier. For different bandwidths, the size of the information domain of each DCI format after CIF has been added therein is as shown in Table 7:

TABLE 7

|  | 1.4 MHz | 3 MHz | 5 MHz | 10 MHz | 15 MHz | 20 MHz |
|---|---|---|---|---|---|---|
| Format 0/1A | 23 | 25 | 27 | 29 | 30 | 31 |
| Format 1 | 22 | 27 | 30 | 34 | 36 | 42 |
| Format 1B | 25 | 28 | 29 | 31 | 33 | 33 |
| Format 1C | 8 | 10 | 12 | 13 | 14 | 15 |
| Format 1D | 25 | 28 | 29 | 31 | 33 | 33 |
| Format 2 | 34 | 37 | 42 | 46 | 48 | 54 |
| Format 2A | 31 | 34 | 39 | 43 | 45 | 51 |
| Format 2B | 28 | 31 | 36 | 41 | 42 | 48 |
| Format 3/3A | 21 | 22 | 25 | 27 | 27 | 28 |

The 60$^{th}$ congress of 3GPP RAN1 physical layer obtains the decision that no CIF would be added into the common search space for DCI format 0 and DCI format 1A, but CIF can be added into the user-specific search space. It can be seen from Tables 1 and 7 that under different bandwidths, the size of the information domain of DCI format 0 and DCI format 1A with no CIF being added and that of the information domain of one certain or few certain DCI formats with CIF being added may be the same, thus, the overlapped portion of the common search space and the user-specific search space will have two or more DCI formats with the same size of information domain, which will affect the PDCCH monitoring. However, there is still no method for solving this problem in the related art, which brings inconvenience to the actual application.

At the same time, when enabling scheduling across carriers, the search space of the component carriers which is scheduled across component carriers can be enlarged, and as to how to enlarge the search space, there is still no clear solution to solve this problem currently, bringing inconvenience to the actual application.

Content of the Invention

The technical problem to be solved by the present invention is to provide a method and apparatus for detecting downlink control information, so as to solve the overlap problem of common search space and user-specific search space in Release 10 and solves the block rate problem in the situation of scheduling across carriers being enabled in Release 10.

In order to solve the above problem, the present invention provides a method for detecting downlink control information, comprising:

when scheduling across carriers is enabled, determining by a user equipment a user-specific search space monitoring a physical downlink control channel (PDCCH) according to component carrier indexes, wherein the component carrier indexes comprise component carrier indexes corresponding to various component carriers implementing scheduling across carriers and being scheduled across carriers.

Relative positions among starting positions of the user-specific search spaces corresponding to various component carriers implementing scheduling across carriers and being scheduled across carriers are fixed.

The step of determining by a user equipment a user-specific search space monitoring a physical downlink control channel according to component carrier indexes comprises:

determining a control channel element (CCE) corresponding to a PDCCH candidate m in the user-specific search space $S_k^{(L)}$ according to the following formula:

$$L \cdot \{(Y_k + m + f(L,I)) \bmod \lfloor N_{CCE,k}/L \rfloor\} + i$$

$$Y_k = (A \cdot Y_{k-1}) \bmod D;$$

where $i = 0, \ldots, L-1$, $m = 0, \ldots, M^{(L)}-1$, $M^{(L)}$ is the number of PDCCH candidates to be detected in the search space $S_k^{(L)}$, $k = \lfloor n_s/2 \rfloor$, $\lfloor \ \rfloor$ represents round down, $n_s$ is a timeslot number in a radio frame, $Y_{-1} = n_{RNTI} \neq 0$, $A = 39827$, $D = 65537$, $n_{RNTI}$ is a corresponding radio network temporary identifier, $N_{CCE,k}$ is the number of CCEs of a PDCCH control domain carried by the $k^{th}$ subframe, and $f(L, I)$ is a function with input thereof being component carrier index I and aggregation level L.

$$f(L, I) = \frac{N}{L} \cdot I$$

or $f(L, I) = M^{(L)} \cdot I$, wherein N is a multiple of L.

Within different subframes, generation manners of the user-specific search spaces corresponding to various component carriers implementing scheduling across carriers and being scheduled across carriers are different from each other.

The step of determining by a user equipment a user-specific search space monitoring a physical downlink control channel according to component carrier indexes comprises: determining a control channel element (CCE) corresponding to the PDCCH candidate m in the user-specific search space $S_k^{(L)}$ according to the following formula:

$$L \cdot \{(Y_k+m) \bmod \lfloor N_{CCE,k}/L \rfloor\}+i$$

$$Y_k=(A \cdot Y_{k-1}+f(I)) \bmod D$$

where $i=0, \ldots, L-1, m=0, \ldots, M^{(L)}-1$, $M^{(L)}$ is the number of PDCCH candidates to be detected in the search space $S_k^{(L)}$, $Y_{-1}=n_{RNTI} \neq 0$, $A=39827$, $D=65537$, $k=\lfloor n_s/2 \rfloor$, $\lfloor \ \rfloor$ represents round down, $n_s$ is a timeslot number in a radio frame, $n_{RNTI}$ is a corresponding radio network temporary identifier, $N_{CCE,k}$ is the number of CCEs of a PDCCH control domain carried by the $k^{th}$ subframe, and $f(I)$ is a function with input thereof being component carrier index I.

Initial configurations generated by the user-specific search spaces corresponding to various component carriers implementing scheduling across carriers and being scheduled across carriers are different from each other.

The step of determining by a user equipment a search space monitoring a physical downlink control channel according to component carrier indexes comprises:

determining a control channel element (CCE) corresponding to a PDCCH candidate m in the user-specific search space $S_k^{(L)}$ according to the following formula:

$$L \cdot \{(Y_k+m) \bmod \lfloor N_{CCE,k}/L \rfloor\}+i$$

$$Y_k=(A \cdot Y_{k-1}) \bmod D, Y_{-1}=n_{RNTI}+f(I) \neq 0;$$

where $i=0, \ldots, L-1, m=0, \ldots, M^{(L)}-1$, $M^{(L)}$ is the number of PDCCH candidates to be detected in the search space $S_k^{(L)}$, $A=39827$, $D=65537$, $k=\lfloor n_s/2 \rfloor$, $\lfloor \ \rfloor$ represents round down, $n_s$ is a timeslot number in a radio frame, $n_{RNTI}$ is a corresponding radio network temporary identifier, $N_{CCE,k}$ is the number of CCEs of a PDCCH control domain carried by the $k^{th}$ subframe, and $f(I)$ is a function with input thereof being component carrier index I.

$$f(I)=2^{16} \cdot I.$$

The component carrier indexes of various component carriers are configured according to the following manner:

setting the component carrier index of the component carrier implementing scheduling across carriers as a designated value, and configuring the component carrier indexes of the various remaining component carriers being scheduled across carriers sequentially subsequent to the designated value from high to low or from low to high according to the frequency point locations thereof, with the designated value being 0;

or, configuring the component carrier indexes of the various component carriers implementing scheduling across carriers and being scheduled across carriers from high to low or from low to high according to frequency point locations thereof;

or, randomly configuring component carrier indexes for the various component carriers implementing scheduling across carriers and being scheduled across carriers;

or, configuring component carrier indexes according to carrier indication domains corresponding to the various component carriers implementing scheduling across carriers and being scheduled across carriers.

Before the step of determining by a user equipment user-specific search space monitoring a PDCCH according to component carrier indexes, the method further comprises:

judging by the user equipment whether there are at least two continuous component carriers with bands thereof being less than or equal to a designated frequency bandwidth after being aggregated in the component carriers implementing scheduling across carriers and being scheduled across carriers, if yes, then the user equipment not determining the user-specific search space monitoring the PDCCH according to the component carrier indexes; and if no, then the user equipment determining the user-specific search space monitoring the PDCCH according to the component carrier indexes.

When scheduling across carriers is enabled, on the component carriers implementing scheduling across carriers, the common search space when the user equipment monitors the PDCCH is N times of the common search space corresponding to the component carriers implementing scheduling across carriers, wherein N is not greater than a sum of the number of component carriers implementing scheduling across carriers and the number of component carriers being scheduled across carriers.

When sizes of the information domains of downlink control information formats configured on the component carriers implementing scheduling across carriers and component carriers being scheduled across carriers are different, after the step of determining by a user equipment a user-specific search space monitoring a physical downlink control channel according to component carrier indexes, the method further comprises: monitoring the PDCCH by the user equipment for the various component carriers on an independent search space of the various component carriers.

When sizes of the information domains of downlink control information formats configured on the component carriers implementing scheduling across carriers and component carriers being scheduled across carriers are the same, after the step of determining by a user equipment a user-specific search space monitoring a physical downlink control channel according to component carrier indexes, the method further comprises: monitoring the PDCCH by the user equipment for the various component carriers on a shared search space, with the shared search space including search space composed of the search spaces of the various component carriers.

When scheduling across carriers is enabled, if size of information domain of a downlink control information format (DCI format) under a user-specific search space condition is the same as that of the DCI format under a common search space condition, and the DCI format under the user-specific search space condition and the DCI format under the common search space condition employ the same cyclic redundancy checksum scrambled by a radio network temporary identifier, the PDCCH monitoring is carried out only according to the DCI format of the common search space, or the PDCCH monitoring is carried out only according to the DCI format of the user-specific search space.

In order to solve the above problem, the present invention also provides a method for detecting downlink control information, comprising:

when scheduling across carriers is enabled, if size of an information domain of a downlink control information format (DCI format) under a user-specific search space condition is the same as that of the DCI format under a common search space condition, and the DCI format under the user-specific search space condition and the DCI format under the common search space condition employ cyclic redundancy check scrambled by the same radio network temporary identifier, adding bits into the DCI format in the user-specific search space so that the information domain of the DCI format under the user-specific search space condition is different from that of the DCI format under the common search space condition; and carrying out by the user equipment downlink control information detection according to the size of the information domain of the DCI format after the bits have been added therein.

The step of adding bits comprises adding one or more zero bits.

In order to solve the above problem, the present invention also provides a user equipment, configured to: when scheduling across carriers is enabled, determine a user-specific search space monitoring a physical downlink control channel (PDCCH) according to component carrier indexes, wherein the component carrier indexes comprise component carrier indexes corresponding to various component carriers implementing scheduling across carriers and being scheduled across carriers.

The user equipment is configured to determine a control channel element (CCE) corresponding to a PDCCH candidate m in the user-specific search space $S_k^{(L)}$ according to the following formula:

$$L \cdot \{(Y_k + m + f(L,I)) \bmod \lfloor N_{CCE,k}/L \rfloor\} + i$$

$$Y_k = (A \cdot Y_{k-1}) \bmod D;$$

where $i=0, \ldots, L-1$, $m=0, \ldots, M^{(L)}-1$, $M^{(L)}$ is the number of PDCCH candidates to be detected in the search space $S_k^{(L)}$, $k=\lfloor n_s/2 \rfloor$, $\lfloor \; \rfloor$ represents round down, $n_s$ is a timeslot number in a radio frame, $Y_{-1}=n_{RNTI} \neq 0$, $A=39827$, $D=65537$, $n_{RNTI}$ is a corresponding radio network temporary identifier, $N_{CCE,k}$ is the number of CCEs of a PDCCH control domain carried by the $k^{th}$ subframe, and $f(L, I)$ is a function with the input thereof being component carrier index I and aggregation level L.

$$f(L, I) = \frac{N}{L} \cdot I$$

or $f(L, I) = M^{(L)} \cdot I$, wherein N is a multiple of L.

The user equipment is configured to determine a control channel element (CCE) corresponding to a PDCCH candidate m in the user-specific search space $S_k^{(L)}$ according to the following formula:

$$L \cdot \{(Y_k + m) \bmod \lfloor N_{CCE,k}/L \rfloor\} + i$$

$$Y_k = (A \cdot Y_{k-1} + f(I)) \bmod D$$

where $i=0, \ldots, L-1$, $m=0, \ldots, M^{(L)}-1$, $M^{(L)}$ is the number of PDCCH candidates to be detected in the search space $S_k^{(L)}$, $Y_{-1}=n_{RNTI} \neq 0$, $A=39827$, $D=65537$, $k=\lfloor n_s/2 \rfloor$, $\lfloor \; \rfloor$ represents round down, $n_s$ is a timeslot number in a radio frame, $n_{RNTI}$ is a corresponding radio network temporary identifier, $f(I)$ is a function with the input thereof being component carrier index I, and $N_{CCE,k}$ is the number of CCEs of a PDCCH control domain carried by the $k^{th}$ subframe.

The user equipment is configured to determine a control channel element (CCE) corresponding to a PDCCH candidate m in the user-specific search space $S_k^{(L)}$ according to the following formula:

$$L \cdot \{(Y_k + m) \bmod \lfloor N_{CCE,k}/L \rfloor\} + i$$

$$Y_k = (A \cdot Y_{k-1}) \bmod D, Y_{-1} = n_{RNTI} + f(I) \neq 0;$$

where $i=0, \ldots, L-1$, $m=0, \ldots, M^{(L)}-1$, $M^{(L)}$ is the number of PDCCH candidates to be detected in the search space $S_k^{(L)}$, $A=39827$, $D=65537$ $k=\lfloor n_s/2 \rfloor$, $\lfloor \; \rfloor$ represents round down, $n_s$ is a timeslot number in a radio frame, $n_{RNTI}$ is a corresponding radio network temporary identifier, $f(I)$ is a function with the input thereof being component carrier index I, $N_{CCE,k}$ is the number of CCEs of a PDCCH control domain carried by the $k^{th}$ subframe.

$$f(I) = 2^{16} \cdot I.$$

The user equipment is further configured to: receive the component carrier indexes of the various component carriers configured according to the following manner:

setting the component carrier index of the component carrier implementing scheduling across carriers as a designated value, with the designated value being 0, and sequentially configuring the component carrier indexes for the various remaining component carriers being scheduled across carriers subsequent to the designated value from high to low or from low to high according to frequency point locations thereof;

or, configuring the component carrier indexes of the various component carriers implementing scheduling across carriers and being scheduled across carriers from high to low or from low to high according to the frequency point locations thereof;

or, randomly configuring component carrier indexes for the various component carriers implementing scheduling across carriers and being scheduled across carriers;

or, configuring component carrier indexes according to carrier indication domains corresponding to the various component carriers implementing scheduling across carriers and being scheduled across carriers.

The user equipment is further configured to: before determining the search space for PDCCH monitoring according to the component carrier indexes, judge whether there are at least two continuous component carriers with bands thereof being less than or equal to a designated frequency bandwidth after being aggregated in the component carriers implementing scheduling across carriers and being scheduled across carriers, if yes, then the user equipment does not determine the search space for the PDCCH monitoring according to the component carrier indexes; and if no, then the user equipment determines the search space for the PDCCH monitoring according to the component carrier indexes.

When scheduling across carriers is enabled, on the component carriers implementing scheduling across carriers, a common search space when the user equipment monitors the PDCCH is N times of the common search space corresponding to the component carriers implementing scheduling across carriers, wherein N is not greater than a sum of the number of component carriers implementing scheduling across carriers and the number of component carriers being scheduled across carriers.

The user equipment is further configured to: when sizes of information domains of downlink control information formats configured on the component carriers implementing scheduling across carriers and component carriers being scheduled across carriers are different, after having determined the user-specific search space monitoring the physical downlink control channel according to the component carrier indexes, carry out PDCCH monitoring on the various component carriers on an independent search space of the various component carriers.

The user equipment is further configured to: when sizes of information domains of downlink control information formats configured on the component carriers implementing scheduling across carriers and component carriers being scheduled across carriers are same, after having determined the user-specific search space monitoring the physical downlink control channel according to the component carrier indexes, carry out PDCCH monitoring on the various component carriers on a shared search space, with the shared search space including a search space composed of the search space of the various component carriers.

The user equipment is further configured to: when scheduling across carriers is enabled, if size of information domain of a downlink control information format (DCI format) under a user-specific search space condition is the same as that of the DCI format under a common search space condition, and the DCI format under the user-specific search space condition and the DCI format under the common search space condition employ cyclic redundancy check scrambled by a same radio network temporary identifier, carry out PDCCH monitoring only according to the DCI format of the common search space, or carry out PDCCH monitoring only according to the DCI format of the user-specific search space.

In order to solve the above problem, the present invention also provides an apparatus for detecting downlink control information, comprising a network side device and a user equipment, wherein:

the network side device is configured to: when scheduling across carriers is enabled, if size of an information domain of a downlink control information format (DCI format) under a user-specific search space condition is the same as that of the DCI format under a common search space condition, and the DCI format under the user-specific search space condition and the DCI format under the common search space condition employ cyclic redundancy check scrambled by a same radio network temporary identifier, add bits into the DCI format in the user-specific search space so that the information domain of the DCI format under the user-specific search space condition is different from that of the DCI format under the common search space condition; and the user equipment is configured to: carry out downlink control information detection according to the size of the information domain of the DCI format after the bits have been added therein.

The network side device is configured to add bits according to the following manner: add one or more zero bits.

In order to solve the above problem, the present invention also provides a network side device, configured to:

when scheduling across carriers is enabled, if size of information domain of a downlink control information format (DCI format) under a user-specific search space condition is the same as that of the DCI format under a common search space condition, and the DCI format under the user-specific search space condition and the DCI format under the common search space condition employ cyclic redundancy check scrambled by a same radio network temporary identifier, add bits into the DCI format in the user-specific search space so that the information domain of the DCI format under the user-specific search space condition is different from that of the DCI format under the common search space condition and the user equipment carries out downlink control information detection according to the size of the information domain of the DCI format after bits have been added therein.

The network side device is configured to add bits according to the following manner: add one or more zero bits.

In summary, the present invention solves the problem of the PDCCH monitoring at the UE end due to that the size of the information domain of the DCI format under the user-specific search space condition and that of the information domain of the DCI format under the common search space condition may be the same when scheduling across carriers is enabled in the LTE-Advanced carrier aggregation scenario. Moreover, the problem that how to define the search space for the UE to detect the PDCCH when scheduling across carriers is enabled is solved.

PREFERRED EMBODIMENTS OF THE PRESENT INVENTION

The method and apparatus for detecting downlink control information provided by the present invention are used for managing the PDCCH monitoring in the carrier aggregation system.

Figure 1:
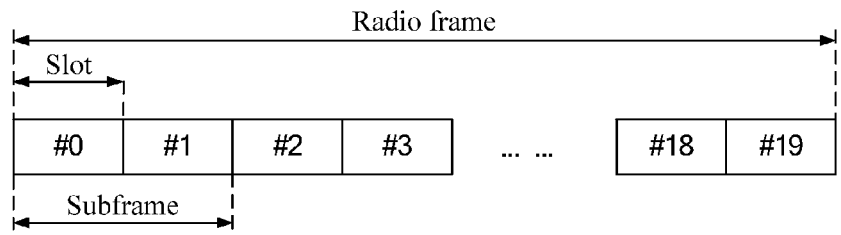
FIG. 1 is a schematic diagram of a frame structure of an FDD mode in the related art.
Figure 2:
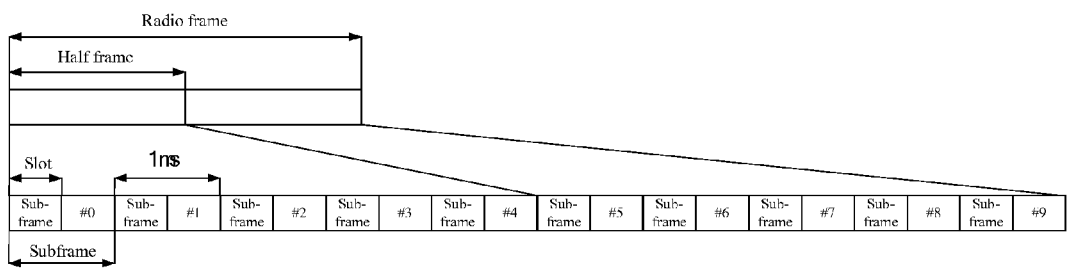
FIG. 2 is a schematic diagram of a frame structure of a TDD mode in the related art.
Figure 3:
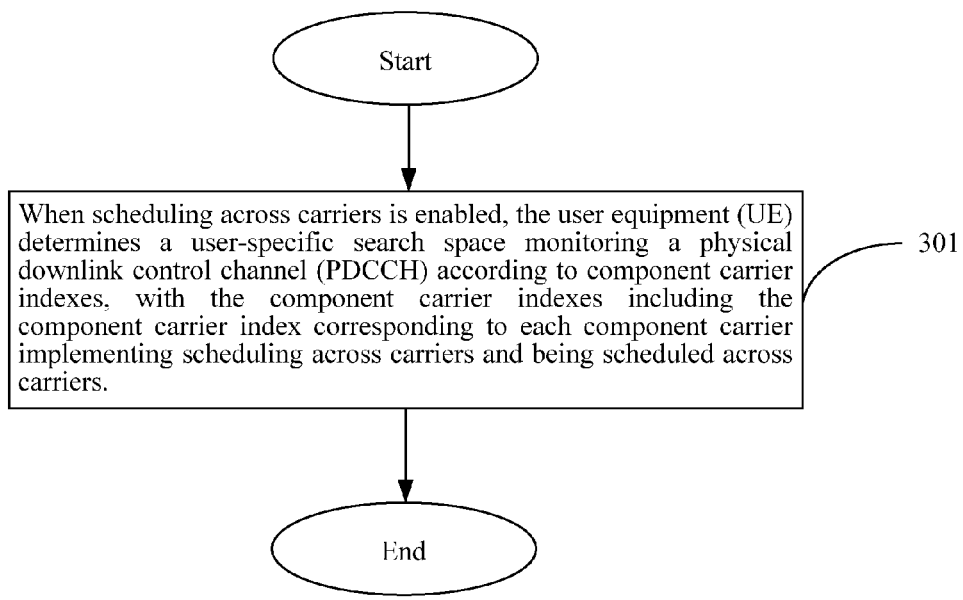
FIG. 3 is a schematic diagram of a method for detecting downlink control information according to an embodiment of the present invention.

The present invention provides a method for detecting downlink control information, and as shown in FIG. 3, it comprises:

step 301: when enabling scheduling across carriers, user equipment (UE) determines a user-specific search space monitoring a physical downlink control channel (PDCCH) according to component carrier indexes, wherein the component carrier indexes comprise component carrier indexes corresponding to various component carriers implementing scheduling across carriers and being scheduled across carriers.

The search space of the PDCCH can be determined particularly according to the following three methods:

1) the relative positions, among the starting positions of user-specific search space corresponding to various component carriers implementing scheduling across carriers and being scheduled across carriers, are fixed.

The user equipment determines the user-specific search space by changing the CCE formula corresponding to a PDCCH candidate m in the search space $S_k^{(L)}$ in R8:

$$L \cdot \{(Y_k + m + f(L,I)) \bmod \lfloor N_{CCE,k}/L \rfloor\} + i$$

where $i=0, \ldots, L-1$, $m=0, \ldots, M^{(L)}-1$, $M^{(L)}$ is the number of PDCCH candidates to be detected in the search space $S_k^{(L)}$, $N_{CCE,k}$ is the number of CCEs of a PDCCH control domain carried by the $k^{th}$ subframe, and $f(L, I)$ is a function with the input thereof being component carrier index I and aggregation level L.

The definition of $f(L, I)$ can make reference to the following formula:

$$f(L, I) = \frac{N}{L} \cdot I$$

or $f(L, I) = M^{(L)} \cdot I$, wherein N is a multiple of L, for example, N takes the value of 16.

The remaining design is the same as that in LTE Release 8.

2) within different subframes, the generation manners of the user-specific search space corresponding to various component carriers implementing scheduling across carriers and being scheduled across carriers are different from each other.

That is, the user-specific search space can be determined by changing the formula of $Y_k$:

as to UE-specific search space, L takes the values of 1, 2, 4, and 8.

$$Y_k = (A \cdot Y_{k-1} + f(I)) \bmod D,$$

where $Y_{-1} = n_{RNTI} \neq 0$, $A=39827$, $D=65537$, $k=\lfloor n_s/2 \rfloor$, $n_s$ is a slot number in a radio frame. $n_{RNTI}$ is the corresponding radio network temporary identifier (RNTI). $f(I)$ is a function with the component carrier index I being the input thereof.

The definition of $f(I)$ can make reference to the following formula:

$$f(I)=2^{16} \cdot I$$

The remaining design is the same as that in LTE Release 8.

3) the initial configurations generated by the user-specific search space corresponding to various component carriers implementing scheduling across carriers and being scheduled across carriers are different from each other.

The method for determining PDCCH search space can also be done by changing the formula of $Y_{-1}$:

determining the CCE corresponding to the PDCCH candidate m in the user-specific search space $S_k^{(L)}$ according to the following formula:

$$L \cdot \{(Y_k+m) \bmod \lfloor N_{CCE,k}/L \rfloor\}+i$$

As to UE-specific search space, L takes the values of 1, 2, 4, and 8.

$$Y_k=(A \cdot Y_{k-1}) \bmod D$$

$$Y_{-1}=n_{RNTI}+f(I) \neq 0$$

where A=39827, D=65537, k=$\lfloor n_s/2 \rfloor$, $n_s$ is a slot number in a radio frame. $n_{RNTI}$ is the corresponding RNTI (Radio Network Temporary Identifier) of the user equipment. $f(I)$ is a function with the component carrier index I being the input thereof.

The definition of $f(I)$ can make reference to the following formula:

$$f(I)=2^{16} \cdot I$$

The remaining design is the same as that in LTE Release 8.

In this case, the component carrier indexes of various component carriers are configured according to the following manner:

setting the component carrier index of the component carrier implementing scheduling across carriers as a designated value, with the designated value being 0, and it can be represented as 000 when being represented with a binary, and sequentially configuring the component carrier indexes of the various remaining component carriers being scheduled across carriers subsequent to the designated value from high to low or from low to high according to the frequency point locations thereof;

or, configuring the component carrier indexes of the various component carriers implementing scheduling across carriers and being scheduled across carriers from high to low or from low to high according to the frequency point locations thereof;

or, randomly configuring component carrier indexes of the various component carriers implementing scheduling across carriers and being scheduled across carriers;

or, configuring component carrier indexes according to the carrier indication domains corresponding to the various component carriers implementing scheduling across carriers and being scheduled across carriers.

For further description, as to the above method for enlarging the search space of PDCCH monitoring, it relates to the situation of enabling scheduling across carriers, for the component carrier index I corresponding to each component carrier, by predefining the component carrier index I corresponding to various component carriers implementing scheduling across carriers and being scheduled across carriers, the index corresponding to the component carriers implementing scheduling across carriers can be set as 0, the other component carriers which needs to be being scheduled across carriers can be arranged in an order from large to small according to the size of the bandwidth, and can also be arranged in an order from small to large, and the value thereof ranges from 1 to 4.

For further description, as to the above method for enlarging the search space of PDCCH monitoring, it relates to the situation of enabling scheduling across carriers, for the component carrier index I corresponding to each component carrier, by predefining the component carrier index I corresponding to various component carriers implementing scheduling across carriers and being scheduled across carriers, these component carriers are arranged in an order from large to small according to the size of the bandwidth, and can also be arranged in an order from small to large, and the value thereof ranges from 0 to 4.

For further description, as to the above method for enlarging the search space of PDCCH monitoring, it relates to the situation of enabling scheduling across carriers, for the component carrier index I corresponding to each component carrier, by predefining the component carrier index I corresponding to various component carriers implementing scheduling across carriers and being scheduled across carriers, and the index I is randomly allocated to these component carriers, and the value thereof ranges from 0 to 4.

For further description, as to the above method for enlarging the search space of PDCCH monitoring, it relates to the situation of enabling scheduling across carriers, for the component carrier index I corresponding to each component carrier, the component carrier index I thereof can be allocated according to the CIF values corresponding to various component carriers implementing scheduling across carriers and being scheduled across carriers, and the value thereof ranges from 0 to 4. For example, the value of CIF is 010, then the component carrier index I is 2.

For further description, when enabling scheduling across carriers, if the bands of at least two continuous component carriers after aggregation are less than or equal to the designated frequency bandwidth in the component carriers implementing scheduling across carriers and the component carriers being scheduled across carriers, it is unnecessary to enlarge the search space for the UE to monitor the PDCCH, i.e. the user equipment does not determine the user-specific search space for monitoring the PDCCH according to the component carrier indexes; otherwise, the user equipment determines the user-specific search space for monitoring the PDCCH according to the component carrier indexes. The designated frequency bandwidth is 20 MHz, or can be set as other values as required.

Furthermore, when scheduling across carriers is enabled, on the component carriers implementing scheduling across carriers, the common search space when the user equipment monitors the PDCCH is N times of the common search space corresponding to the component carriers implementing scheduling across carriers, wherein N is not greater than the sum of the number of component carriers implementing scheduling across carriers and the number of component carriers being scheduled across carriers.

When scheduling across carriers is enabled, if the size of the information domain of the downlink control information format (DCI format) under the user-specific search space condition is the same as that of the DCI format under the common search space condition, and the DCI format under the user-specific search space condition and the DCI format under the common search space condition employ cyclic redundancy checksum (CRC) scrambled by the same radio network temporary identifier (RNTI), a method of adding bits into DCI format of the user-specific search space in this situation can be adopted to make the sizes of the information domains thereof different.

When scheduling across carriers is enabled, if the size of the information domain of the DCI format under the user-specific search space condition is the same as that of the DCI format under the common search space condition, and the DCI format under the user-specific search space condition and the DCI format under the common search space condition employ the same cyclic redundancy checksum (CRC) scrambled by the radio network temporary identifier (RNTI), the PDCCH monitoring can be carried out only according to the DCI format of the common search space, i.e. in this overlapped search space, if the DCI format is detected, the processing will be carried out only according to the DCI format of the common search space.

When scheduling across carriers is enabled, if the size of the information domain of the DCI format under the user-specific search space condition is the same as that of the DCI format under the common search space condition, and the DCI format under the user-specific search space condition and the DCI format under the common search space condition employ the same cyclic redundancy check (CRC) scrambled by the radio network temporary identifier (RNTI), the PDCCH monitoring can be carried out only according to the DCI format of the user-specific search space, i.e. in this overlapped search space, if the DCI format is detected, the processing will be carried out only according to the DCI format of the user-specific search space.

Embodiment I

In the carrier aggregation scenario of LTE-Advanced, when scheduling across carriers is enabled, the block rate of UE monitoring can be reduced by enlarging the PDCCH user-specific search space on the component carriers implementing scheduling across carriers.

As to how to enlarge the PDCCH user-specific search space during scheduling across carriers, there are the following methods:

Method I:

when scheduling across carriers is enabled, the high layer will notify the physical layer to schedule which other component carriers on one certain component carrier, i.e. the index of which component carrier will be obtained, here, the parameter of this index can be set as I, and the value range is $\{0, 1, 2, 3, 4\}$.

Then, when scheduling across carriers is enabled, the user-specific search space of PDCCH monitoring can be enlarged according to the component carriers to be scheduled, and the CCE corresponding to the PDCCH candidate m in the search space $S_k(L)$ can be defined by the following formula:

$$L \cdot \{(Y_k + m + f(L,I)) \bmod \lfloor N_{CCE,k}/L \rfloor\} + i,$$

where $i=0, \ldots, L-1$, $m=0, \ldots, M^{(L)}-1$, $M^{(L)}$ is the number of PDCCH candidates to be detected in the search space $S_k^{(L)}$. $f(L, I)$ is a function with the component carrier index I and aggregation level L being the input thereof.

The definition of $f(L, I)$ can make reference to the following formula:

$$f(L, I) = \frac{N}{L} \cdot I$$

or $f(L,I) = M^{(L)} \cdot I$

Where, the value of N is preferably 16.

The remaining design is the same as that in LTE Release 8.

Method II:

when scheduling across carriers is enabled, the high layer will notify the physical layer to schedule which other component carriers on one certain component carrier, i.e. the index of which component carrier will be obtained, here, the parameter of this index can be set as I, and the value range is $\{0, 1, 2, 3, 4\}$.

Then, when scheduling across carriers is enabled, the user-specific search space of PDCCH monitoring can be enlarged according to the component carriers to be scheduled, and the CCE corresponding to the PDCCH candidate m in the search space $S_k^{(L)}$ can be defined by the following formula:

$$L \cdot \{(Y_k + m) \bmod \lfloor N_{CCE,k}/L \rfloor\} + i$$

where $i=0, \ldots, L-1$, $m=0, \ldots, M^{(L)}-1$, $M^{(L)}$ is the number of PDCCH candidates to be detected in the search space $S_k^{(L)}$.

As to common search space, $Y_k=0$, L takes the values of 4 and 8.

As to UE-specific search space, L takes the values of 1, 2, 4, and 8.

$$Y_k = (A \cdot (Y_{k-1} + f(I))) \bmod D,$$

where $Y_{-1} = n_{RNTI} \neq 0$, $A=39827$, $D=65537$, $k=\lfloor n_s/2 \rfloor$, $n_s$ is a slot number in a radio frame. $n_{RNTI}$ is a corresponding RNTI (Radio Network Temporary Identifier). $f(I)$ is a function with the component carrier index I being the input thereof.

The definition of $f(I)$ can make reference to the following formula:

$$f(I) = 2^{16} \cdot I$$

The remaining design is the same as that in LTE Release 8.

Method III:

when scheduling across carriers is enabled, the high layer will notify the physical layer to schedule which other component carriers on one certain component carrier, i.e. the index of which component carrier will be obtained, here, the parameter of this index can be set as I, and the value range is $\{0, 1, 2, 3, 4\}$.

Then, when scheduling across carriers is enabled, the user-specific search space of PDCCH monitoring can be enlarged according to the component carriers to be scheduled, and the CCE corresponding to the PDCCH candidate m in the search space $S_k^{(L)}$ can be defined by the following formula:

$$L \cdot \{(Y_k + m) \bmod \lfloor N_{CCE,k}/L \rfloor\} + i$$

where $i=0, \ldots, L-1$, $m=0, \ldots, M^{(L)}-1$, $M^{(L)}$ is the number of PDCCH candidates to be detected in the search space $S_k^{(L)}$.

As to common search space, $Y_k=0$, L takes the values of 4 and 8.

As to UE-specific search space, L takes the values of 1, 2, 4, and 8.

$$Y_k = (A \cdot Y_{k-1}) \bmod D,$$

where $Y_{-1} = n_{RNTI} \neq 0$, $A=39827$, $D=65537$, $k=\lfloor n_s/2 \rfloor$, $n_s$ is a slot number in a radio frame. $n_{RNTI}$ is a corresponding RNTI (Radio Network Temporary Identifier). $f(I)$ is a function with the component carrier index I being the input thereof.

The definition of $f(I)$ can make reference to the following formula:

$$f(I) = 2^{16} \cdot I$$

The remaining design is the same as that in LTE Release 8.

As to the above method for enlarging the user-specific search space of PDCCH monitoring, it relates to the problem of the component carrier index I corresponding to each component carrier in the situation of scheduling across carriers being enabled, and there are four methods:

Method I:

when scheduling across carriers is enabled, the component carrier index I corresponding to various component carriers implementing scheduling across carriers and being scheduled across carriers can be preset, the index corresponding to the component carriers implementing scheduling across carriers is set as 0, the other component carriers which needs to be being scheduled across carriers can be arranged in an order from large to small according to the frequency point immediately after 0, and can also be arranged in an order from small to large, and the value thereof ranges from 1 to 4.

Method II:

when scheduling across carriers is enabled, the component carrier index I corresponding to various component carriers implementing scheduling across carriers and being scheduled across carriers can be preset, these component carriers can be arranged in an order from large to small according to the frequency point, and can also be arranged in an order from small to large, and the value thereof ranges from 0 to 4.

Method III:

when scheduling across carriers is enabled, the component carrier index I corresponding to various component carriers implementing scheduling across carriers and being scheduled across carriers can be preset, the index I is randomly allocated to these component carriers, and value thereof ranges from 0 to 4.

Method IV:

when scheduling across carriers is enabled, the component carrier index I is allocated according to the CIF values corresponding to the various component carriers implementing scheduling across carriers and being scheduled across carriers, and the value thereof ranges from 0 to 4. For example, the value of CIF is 010, then the component carrier index I is 2.

Embodiment Two

In the carrier aggregation scenario of LTE-Advanced, when scheduling across carriers is enabled, the common search space for the UE to monitor PDCCH can be enlarged. In particular, on the component carriers implementing scheduling across carriers, the common search space can be enlarged for several times or just one time according to the number of other carriers scheduled.

For example, when one component carrier implementing scheduling across carriers can schedule other 2 component carriers, UE can monitor the PDCCH on the common search space which is three times of its own common search space on this component carrier implementing scheduling across carriers.

Embodiment III

As to the LTE-Advanced carrier aggregation scenario in embodiments I and II, when scheduling across carriers is enabled, in the method which can enlarge the PDCCH search space on the component carriers implementing scheduling across carriers, if the bands of two continuous component carriers after aggregation are smaller than or equal to 20 MHz in the component carriers implementing scheduling across carriers and being scheduled across carriers, the search space for the UE to monitor the PDCCH need not be enlarged.

Embodiment IV

In the LTE-Advanced carrier aggregation scenario, when scheduling across carriers is enabled, the solution for enlarging search space described in embodiments I, II and III in the following two configuration conditions.

Configuration I:

when the sizes of the information domains of the DCI formats configured on the component carriers implementing scheduling across carriers and being scheduled across carriers are different, the UE will respectively monitor the PDCCH for the above component carriers in their own independent search space. The independent search space described here refers to the search space corresponding to the above component carrier itself. At the same time, all these search space belongs to this component carrier implementing scheduling across carriers.

For example, provided that the component carrier A implementing scheduling across carriers can schedule the PDCCHs on component carriers X and Y, here, X and Y can also refer to the component carrier A itself. Then, when scheduling across carriers is enabled, the UE carries out corresponding PDCCH monitoring on the search space corresponding to component carriers X and Y respectively, and the search space corresponding to X and Y both belongs to component carrier A.

Configuration II:

when the sizes of the information domains of the DCI formats configured on the component carriers implementing scheduling across carriers and being scheduled across carriers are the same, the UE will monitor the PDCCH for the above component carriers in the shared search space. The shared search space described here refers to a search space composed of the search space of the above component carriers. At the same time, all these search space belongs to this component carrier implementing scheduling across carriers.

For example, provided that the component carrier A implementing scheduling across carriers can schedule the PDCCHs on component carriers X and Y, here, X and Y can also refer to the component carrier A itself. Then, when scheduling across carriers is enabled, the UE carries out corresponding PDCCH monitoring on common search space composed of the search space corresponding to component carries X and Y respectively, and the search space corresponding to X and Y both belongs to component carrier A.

Embodiment V

In the LTE-Advanced carrier aggregation scenario, when scheduling across carriers is enabled, if the size of the information domain of the DCI format under the user-specific search space condition is the same as that of the DCI format under the common search space condition, and the DCI format under the user-specific search space condition and the DCI format under the common search space condition employ the same cyclic redundancy checksum (CRC) scrambled by the radio network temporary identifier (RNTI), zero bits can be added in such method for DCI format of the user-specific search space in this situation so that the sizes of the information domains thereof are different.

For example, when scheduling across carriers is enabled, CIF needs not be added into the DCI format of common search space, and CIF needs to be added on the user-specific search space. Assuming that the bandwidth of the component carrier implementing scheduling across carriers which needs to monitor the common search space is 5 MHz, then the size of the information domains of DCI format 0 and DCI format 1A of the common search space is 25 bits (see Table 1), and the bandwidth of the component carrier scheduled across carriers is 1.4 MHz, moreover, it requires to monitor DCI format 1B on the user-specific search space, and the size of the information domain of this DCI format 1B under the bandwidth of 1.4 MHz is also 25 bits after CIF has been added therein (see Table 7). At this moment, 1 zero bit can be added into the DCI format 1B so that the size of the information domain thereof is different from the DCI format 0 and 1A of the common search space. Thus, the situation that when the common search space and specific search space are overlapped there are two DCI formats with the same size of information domain is avoided.

The above method can eliminate the error probability when the UE end monitors the PDCCH, since if the DCI format with such size of information domain is monitored, but which DCI format cannot be informed at last, and after the size of the information domain is changed, the DCI format can be distinguished definitely.

Embodiment VI

In the LTE-Advanced carrier aggregation scenario, when scheduling across carriers is enabled, the size of the information domain of the DCI format under the user-specific search space may be same as that of the information domain of the DCI format under the common search space, when the common search space and user-specific search space are overlapped, these DCI formats will not be distinguished. There may have the following two solutions:

Method I:

when common search space and user-specific search space are overlapped, if size of the information domain of the DCI format under the common search space to be monitored is the same as that of the information domain of the DCI format under the user-specific search space, and the DCI format under the user-specific search space and the DCI format under the common search space condition employ the same radio network temporary identifier to scramble the CRC, PDCCH monitoring will be carried out only according to the DCI format in the common search space, i.e. in this overlapped search space, if a DCI format is detected, the processing will be carried out only according to the DCI format in the common search space.

Method II:

when common search space and user-specific search space are overlapped, if the size of the information domain of the DCI format under the common search space to be monitored is the same as that of the information domain of the DCI format under the user-specific search space, and the DCI format under the user-specific search space condition and the DCI format under the common search space condition employ the same radio network temporary identifier to scramble the CRC, PDCCH monitoring will be carried out only according to the DCI format in the user-specific search space, i.e. in this overlapped search space, if a DCI format is detected, the processing will be carried out only according to the DCI format in the user-specific search space.

It will be understood by those skilled in the art that the whole or part of the steps in the above method can be completed by means of program instructing relevant hardwires, the program may be stored in computer readable storage medium, such as readable memory, magnet or optical disk. Alternatively, the whole or part of the above embodiments can be implemented by means of one or more integrated circuits. Accordingly, the respective module/unit in the above embodiments can be implemented by use of hardware or software function module. In this way, the present invention is not limited to any particular combination of hardware and software.

What is described above is merely particular embodiments of the present invention, however, the scope of protection of the present invention is not limited to this; those changes or replacements which can easily be thought by those skilled in the art within the technical scope disclosed in the present invention shall fall within the scope of protection of the present invention. Therefore, the scope of protection of the present invention shall be based on the scope of protection of the claims.

INDUSTRIAL APPLICABILITY

The present invention solves the problem of the PDCCH monitoring at the UE end due to that the size of the information domain of the DCI format under the user-specific search space condition and that of the information domain of the DCI format under the common search space condition may be the same when scheduling across carriers is enabled in the LTE-Advanced carrier aggregation scenario. Moreover, the problem that how to define the search space for the UE to detect the PDCCH when scheduling across carriers is enabled is solved.

What is claimed is:

1. A method for detecting downlink control information, comprising:

when scheduling across carriers is enabled, determining by a user equipment a user-specific search space monitoring a physical downlink control channel (PDCCH) according to component carrier indexes, wherein each component carrier corresponds to one user-specific search space; wherein and the component carrier indexes include indexes of various component carriers implementing scheduling across carriers and component carriers being scheduled across carriers;

wherein, when sizes of the information domains of downlink control information formats configured on the component carriers implementing scheduling across carriers and component carriers being scheduled across carriers are different, after the step of determining by a user equipment a user-specific search space monitoring a physical downlink control channel according to component carrier indexes, the method further comprises: monitoring the PDCCH by the user equipment for the various component carriers on an independent search space of the various component carriers; or, when sizes of the information domains of downlink control information formats configured on the component carriers implementing scheduling across carriers and component carriers being scheduled across carriers are the same, after the step of determining by a user equipment a user-specific search space monitoring a physical downlink control channel according to component carrier indexes, the method further comprises: monitoring the PDCCH by the user equipment for the various component carriers on a shared search space, with the shared search space including search space composed of the search spaces of the various component carriers; or, when scheduling across carriers is enabled, if size of information domain of a downlink control information format (DCI format) under a user-specific search space condition is the same as that of the DCI format under a common search space condition, and the DCI format under the user-specific search space condition and the DCI format under the common search space condition employ the same cyclic redundancy checksum scrambled by a radio network temporary identifier, the PDCCH monitoring is carried out only according to the DCI format of the common search space, or the PDCCH monitoring is carried out only according to the DCI format of the user-specific search space.

2. The method as claimed in claim 1, wherein
relative positions among starting positions of the user-specific search spaces corresponding to various component carriers implementing scheduling across carriers and being scheduled across carriers are fixed.

3. The method as claimed in claim 2, wherein the step of determining by a user equipment a user-specific search space monitoring a physical downlink control channel according to component carrier indexes comprises:
determining a control channel element (CCE) corresponding to a PDCCH candidate m in the user-specific search space $S_k^{(L)}$ according to the following formula:

$$L \cdot \{(Y_k + m + f(L,I)) \bmod \lfloor N_{CCE,k}/L \rfloor\} + i$$

$$Y_k = (A \cdot Y_{k-1}) \bmod D;$$

where $i=0, \ldots, L-1$, $m=0, \ldots, M^{(L)}-1$, $M^{(L)}$ is the number of PDCCH candidates to be detected in the search space $S_k^{(L)}$, $k=\lfloor n_s/2 \rfloor$, $\lfloor\ \rfloor$ represents round down, $n_s$ is a timeslot number in a radio frame, $Y_{-1}=n_{RNTI} \neq 0$, $A=39827$, $D=65537$, $n_{RNTI}$ is a corresponding radio network temporary identifier, $N_{CCE,k}$ is the number of CCEs of a PDCCH control domain carried by the $k^{th}$ subframe, and $f(L, I)$ is a function with input thereof being component carrier index I and aggregation level L.

4. The method as claimed in claim 3, wherein:

$$f(L, I) = \frac{N}{L} \cdot I$$

or $f(L, I) = M^{(L)} \cdot I$, wherein N is a multiple of L.

5. The method as claimed in claim 1, wherein
within different subframes, generation manners of the user-specific search spaces corresponding to various component carriers implementing scheduling across carriers and being scheduled across carriers are different from each other.

6. The method as claimed in claim 5, wherein the step of determining by a user equipment a user-specific search space monitoring a physical downlink control channel according to component carrier indexes comprises: determining a control channel element (CCE) corresponding to the PDCCH candidate m in the user-specific search space $S_k^{(L)}$ according to the following formula:

$$L \cdot \{(Y_k + m) \bmod \lfloor N_{CCE,k}/L \rfloor\} + i$$

$$Y_k = (A \cdot Y_{k-1} + f(I)) \bmod D$$

where $i=0, \ldots, L-1$, $m=0, \ldots, M^{(L)}-1$, $M^{(L)}$ is the number of PDCCH candidates to be detected in the search space $S_k^{(L)}$, $Y_{-1}=n_{RNTI} \neq 0$, $A=39827$, $D=65537$, $k=\lfloor n_s/2 \rfloor$, $\lfloor\ \rfloor$ represents round down, $n_s$ is a timeslot number in a radio frame, $n_{RNTI}$ is a corresponding radio network temporary identifier, $N_{CCE,k}$ is the number of CCEs of a PDCCH control domain carried by the $k^{th}$ subframe, and $f(I)$ is a function with input thereof being component carrier index I.

7. The method as claimed in claim 1, wherein the component carrier indexes of various component carriers are configured according to the following manner:
setting the component carrier index of the component carrier implementing scheduling across carriers as a designated value, and configuring the component carrier indexes of the various remaining component carriers being scheduled across carriers sequentially subsequent to the designated value from high to low or from low to high according to the frequency point locations thereof, with the designated value being 0;
or, configuring the component carrier indexes of the various component carriers implementing scheduling across carriers and being scheduled across carriers from high to low or from low to high according to frequency point locations thereof;
or, randomly configuring component carrier indexes for the various component carriers implementing scheduling across carriers and being scheduled across carriers;
or, configuring component carrier indexes according to carrier indication domains corresponding to the various component carriers implementing scheduling across carriers and being scheduled across carriers.

8. The method as claimed in claim 1, wherein
initial configurations generated by the user-specific search spaces corresponding to various component carriers implementing scheduling across carriers and being scheduled across carriers are different from each other.

9. The method as claimed in claim 8, wherein the step of determining by a user equipment a search space monitoring a physical downlink control channel according to component carrier indexes comprises:
determining a control channel element (CCE) corresponding to a PDCCH candidate m in the user-specific search space $S_k^{(L)}$ according to the following formula:

$$L \cdot \{(Y_k + m) \bmod \lfloor N_{CCE,k}/L \rfloor\} + i$$

$$Y_k = (A \cdot Y_{k-1}) \bmod D, Y_{-1} = n_{RNTI} + f(I) \neq 0;$$

where $i=0, \ldots, L-1$, $m=0, \ldots, M^{(L)}-1$, $M^{(L)}$ is the number of PDCCH candidates to be detected in the search space $S_k^{(L)}$, $A=39827$, $D=65537$, $k=\lfloor n_s/2 \rfloor$, $\lfloor\ \rfloor$ represents round down, $n_s$ is a timeslot number in a radio frame, $n_{RNTI}$ is a corresponding radio network temporary identifier, $N_{CCE,k}$ is the number of CCEs of a PDCCH control domain carried by the $k^{th}$ subframe, and $f(I)$ is a function with input thereof being component carrier index I.

10. A user equipment, configured to: when scheduling across carriers is enabled, determine a user-specific search space monitoring a physical downlink control channel (PDCCH) according to component carrier indexes, each component carrier corresponding to one user-specific search space; wherein and the component carrier indexes include indexes of various component carriers implementing scheduling across carriers and component carriers being scheduled across carriers;
wherein,
the user equipment is further configured to: when sizes of information domains of downlink control information formats configured on the component carriers implementing scheduling across carriers and component carriers being scheduled across carriers are different, after having determined the user-specific search space monitoring the physical downlink control channel according to the component carrier indexes, carry out PDCCH monitoring on the various component carriers on an independent search space of the various component carriers; or,
the user equipment is further configured to: when sizes of information domains of downlink control information formats configured on the component carriers implementing scheduling across carriers and component carriers being scheduled across carriers are same, after having determined the user-specific search space monitoring the physical downlink control channel according to the component carrier indexes, carry out PDCCH monitoring on the various component carriers on a shared search space, with the shared search space including a search space composed of the search space of the various component carriers; or, the user equipment is further configured to: when scheduling across carriers is enabled, if size of information domain of a downlink control information format (DCI format) under a user-specific search space condition is the same as that of the DCI format under a common search space condition, and the DCI format under the user-specific search space condition and the DCI format under the common search space condition employ cyclic redundancy check scrambled by a same radio network temporary identifier, carry out PDCCH monitoring only according to the DCI format of the common search space, or carry out PDCCH monitoring only according to the DCI format of the user-specific search space.

11. The user equipment as claimed in claim 10, wherein the user equipment is configured to determine a control channel element (CCE) corresponding to a PDCCH candidate m in the user-specific search space $S_k^{(L)}$ according to the following formula:

$$L \cdot \{(Y_k + m + f(L,I)) \bmod \lfloor N_{CCE,k}/L \rfloor\} + i$$

$$Y_k = (A \cdot Y_{k-1}) \bmod D;$$

where $i = 0, \ldots, L-1, m = 0, \ldots, M^{(L)}-1$, $M^{(L)}$ is the number of PDCCH candidates to be detected in the search space $S_k^{(L)}$, $k = \lfloor n_s/2 \rfloor$, $\lfloor \ \rfloor$ represents round down, $n_s$ is a timeslot number in a radio frame, $Y_{-1} = n_{RNTI} \neq 0$, $A = 39827$, $D = 65537$, $n_{RNTI}$ is a corresponding radio network temporary identifier, $N_{CCE,k}$ is the number of CCEs of a PDCCH control domain carried by the $k^{th}$ subframe, and $f(L, I)$ is a function with the input thereof being component carrier index I and aggregation level L.

12. The user equipment as claimed in claim 11, wherein $$f(L, I) = \frac{N}{L} \cdot I$$

or $f(L, I) = M^{(L)} \cdot I$, wherein N is a multiple of L.

13. The user equipment as claimed in claim 10, wherein the user equipment is configured to determine a control channel element (CCE) corresponding to a PDCCH candidate m in the user-specific search space $S_k^{(L)}$ according to the following formula:

$$L \cdot \{(Y_k + m) \bmod \lfloor N_{CCE,k}/L \rfloor\} + i$$

$$Y_k = (A \cdot (Y_{k-1} + f(I))) \bmod D$$

where $i = 0, \ldots, L-1, m = 0, \ldots, M^{(L)}-1$, $M^{(L)}$ is the number of PDCCH candidates to be detected in the search space $S_k^{(L)}$, $Y_{-1} = n_{RNTI} \neq 0$, $A = 39827$, $D = 65537$, $k = \lfloor n_s/2 \rfloor$, $\lfloor \ \rfloor$ represents round down, $n_s$ is a timeslot number in a radio frame, $n_{RNTI}$ is a corresponding radio network temporary identifier, $f(I)$ is a function with the input thereof being component carrier index I, and $N_{CCE,k}$ is the number of CCEs of a PDCCH control domain carried by the $k^{th}$ subframe.

14. The user equipment as claimed in claim 10, wherein the user equipment is further configured to: receive the component carrier indexes of the various component carriers configured according to the following manner:

setting the component carrier index of the component carrier implementing scheduling across carriers as a designated value, with the designated value being 0, and sequentially configuring the component carrier indexes for the various remaining component carriers being scheduled across carriers subsequent to the designated value from high to low or from low to high according to frequency point locations thereof;

or, configuring the component carrier indexes of the various component carriers implementing scheduling across carriers and being scheduled across carriers from high to low or from low to high according to the frequency point locations thereof;

or, randomly configuring component carrier indexes for the various component carriers implementing scheduling across carriers and being scheduled across carriers;

or, configuring component carrier indexes according to carrier indication domains corresponding to the various component carriers implementing scheduling across carriers and being scheduled across carriers.

* * * * *

UNITED STATES PATENT AND TRADEMARK OFFICE
CERTIFICATE OF CORRECTION

PATENT NO. : 8,687,579 B2  
APPLICATION NO. : 13/259980  
DATED : April 1, 2014  
INVENTOR(S) : Xin Wu et al.

Page 1 of 1

It is certified that error appears in the above-identified patent and that said Letters Patent is hereby corrected as shown below:

Specification

In column 16, line 23, replace " $\lfloor n_s/2$ " with -- $\lfloor n_s/2 \rfloor$ --.

Signed and Sealed this  
Sixteenth Day of February, 2016

Michelle K. Lee  
*Director of the United States Patent and Trademark Office*